No. 789,562. PATENTED MAY 9, 1905.
W. POLK.
APPARATUS FOR FORMING SAGGARS OR LIKE HOLLOW BOWLS.
APPLICATION FILED JULY 24, 1903. RENEWED DEC. 10, 1904.
5 SHEETS—SHEET 3.
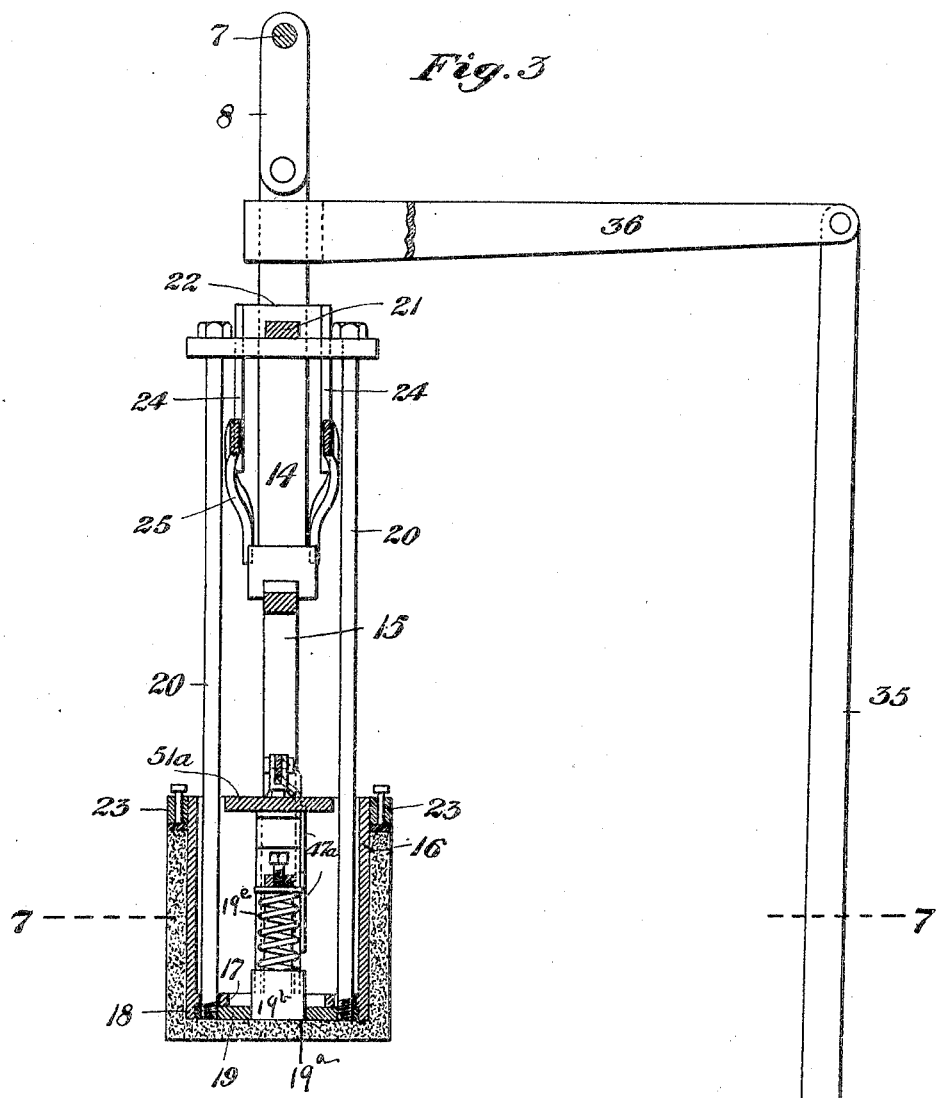
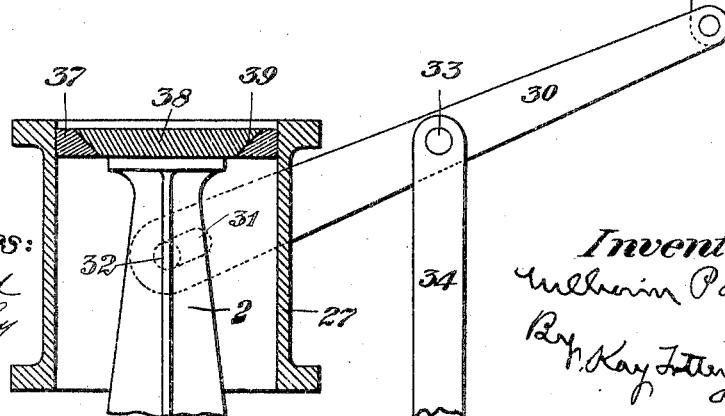
Witnesses:
G. C. Raymond
Geo. B. Rowley
Inventor:
Wilhelm Polk
By N. Kay Totten
attys No. 789,562. PATENTED MAY 9, 1905.
W. POLK.
APPARATUS FOR FORMING SAGGARS OR LIKE HOLLOW BOWLS.
APPLICATION FILED JULY 24, 1903. RENEWED DEC. 10, 1904.
5 SHEETS—SHEET 4.
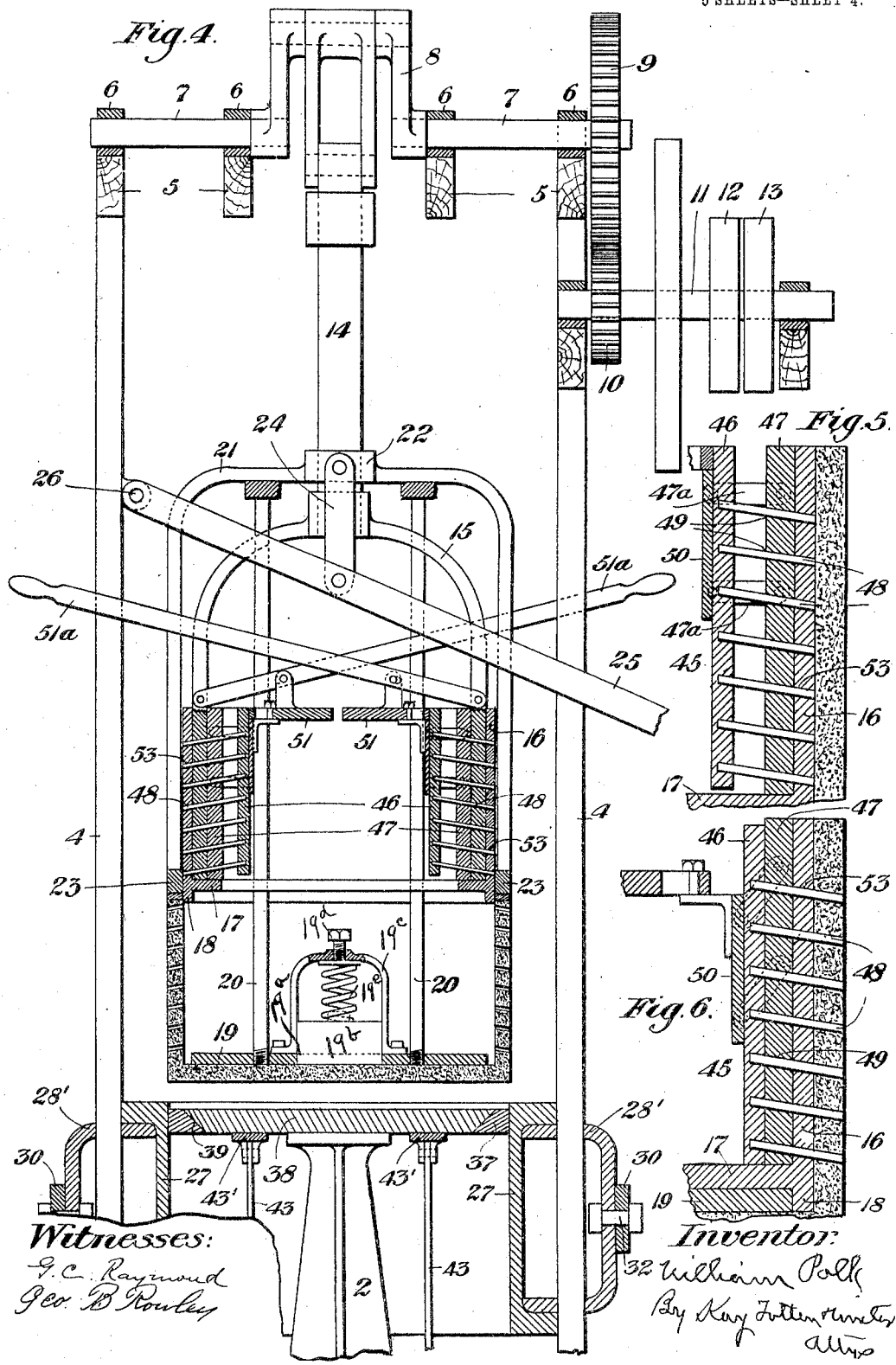
Witnesses:
G. C. Raymond
Geo. B. Rowley
Inventor:
William Polk
By Kay Totten Winter
Attys No. 789,562. Patented May 9, 1905.

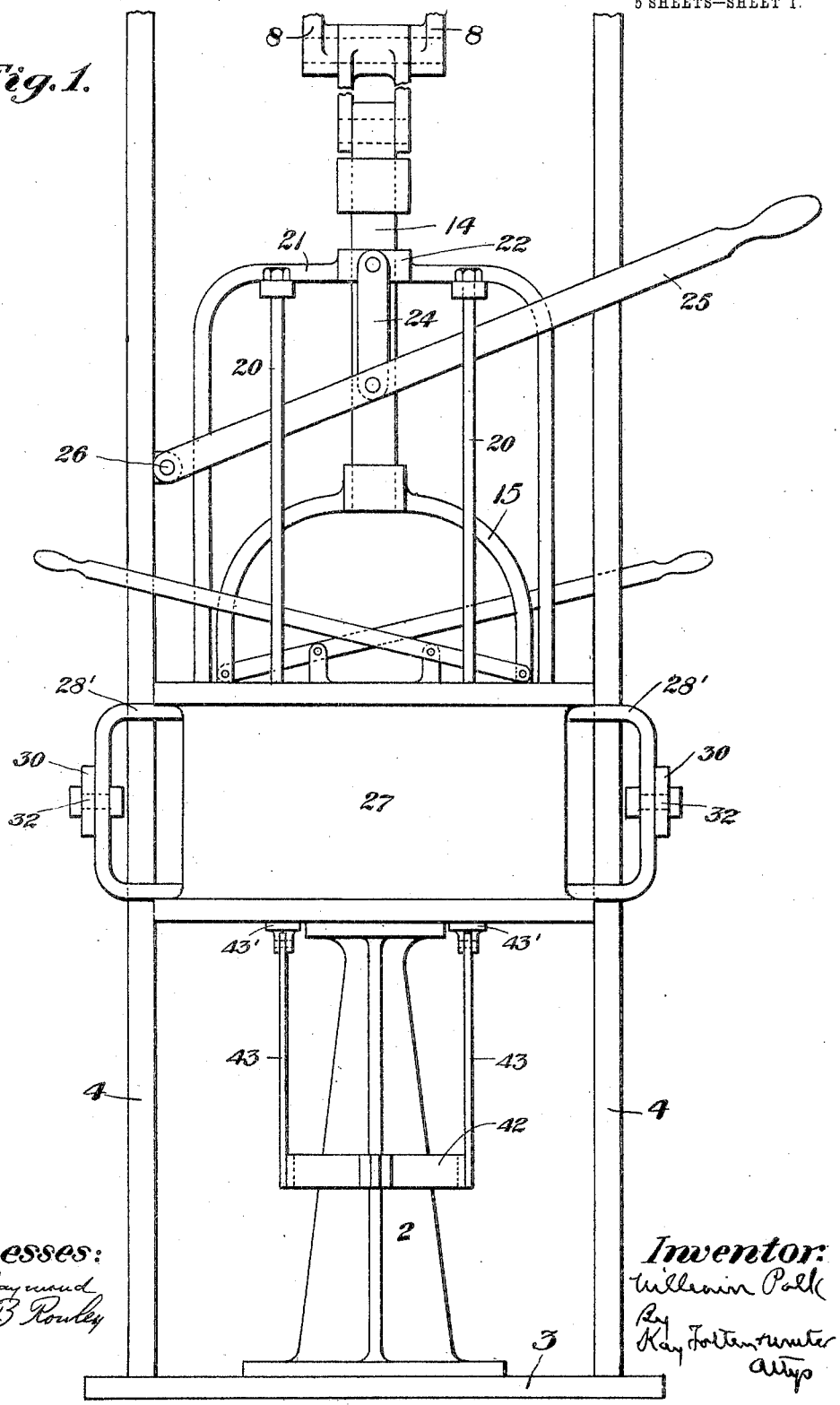

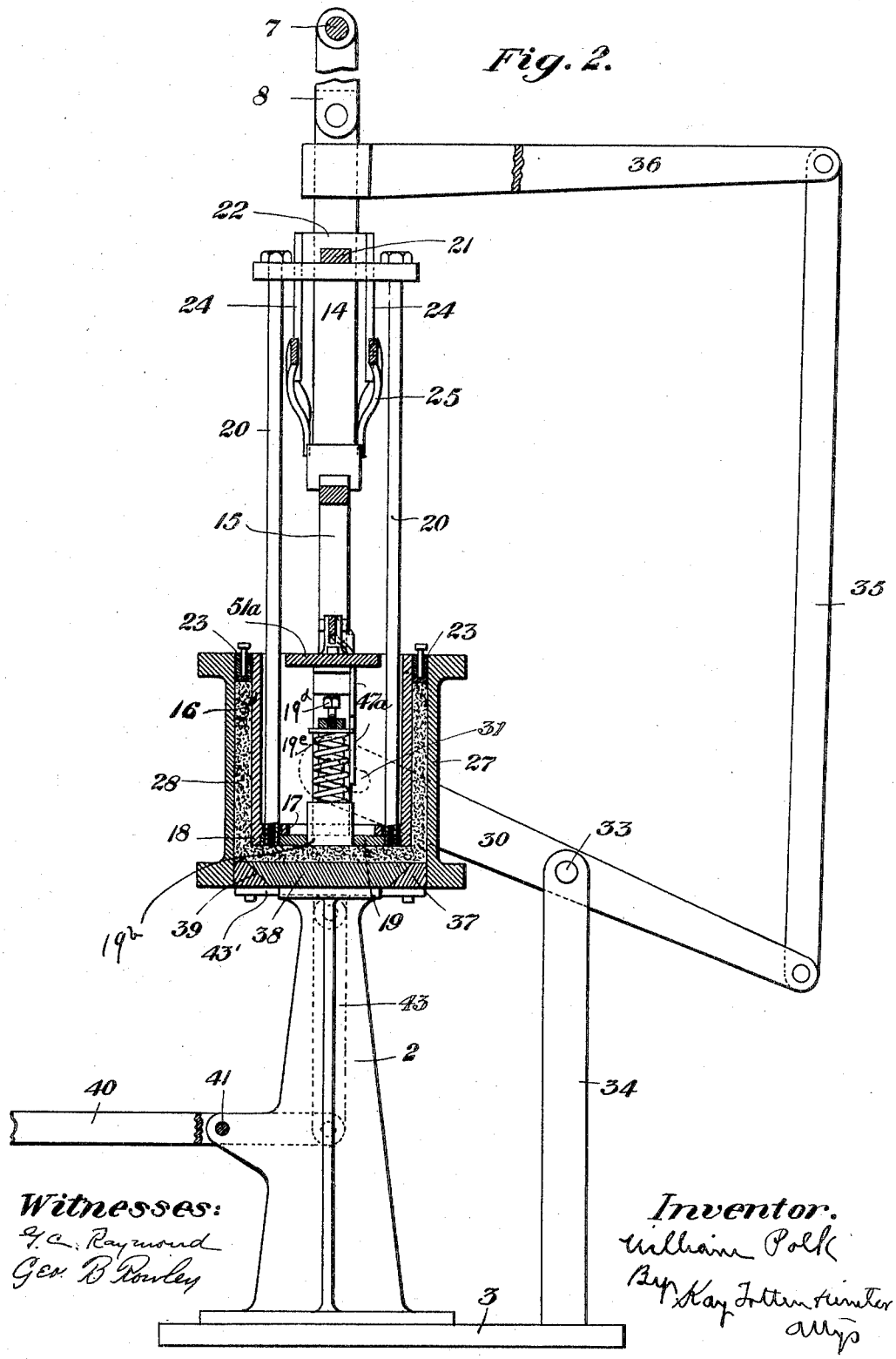

UNITED STATES PATENT OFFICE.

WILLIAM POLK, OF EAST LIVERPOOL, OHIO.

APPARATUS FOR FORMING SAGGARS OR LIKE HOLLOW BOWLS.

SPECIFICATION forming part of Letters Patent No. 789,562, dated May 9, 1905.

Application filed July 24, 1903. Renewed December 10, 1904. Serial No. 236,394.

*To all whom it may concern:*

Be it known that I, WILLIAM POLK, a resident of East Liverpool, in the county of Columbiana and State of Ohio, have invented a new and useful Improvement in Apparatus for Forming Saggars or Like Hollow Bowls; and I do hereby declare the following to be a full, clear, and exact description thereof.

My invention relates to apparatus for forming saggars and other hollow bowls.

The object of my invention is to provide a simple form of apparatus by means of which saggars or like hollow bowls may be quickly and accurately formed into shape, so as to produce the same in large quantities and at reduced cost.

Another object of my invention is to provide for the formation of apertures in the walls of the saggar during the process of molding same to provide for the insertion of pegs or supports to support plates or like articles within the saggar where the saggar is used for such ware.

To these ends my invention comprises, generally stated, a suitable frame with a mold and a plunger, together with mechanism for moving said plunger and mold toward each other, the one entering within the other, so as to form the saggar between the walls thereof, and means for withdrawing the mold and plunger and for removing the saggar from said plunger, all as fully hereinafter set forth and claimed.

My invention further comprises a frame within the mold carrying a series of pins and mechanism for forcing said pins outwardly through apertures in the plunger and through the walls of the saggar formed between the plunger and the outer mold.

To enable others skilled in the art to make and use my invention, I will describe the same more fully, referring to the accompanying drawings, in which—

Figure 7:
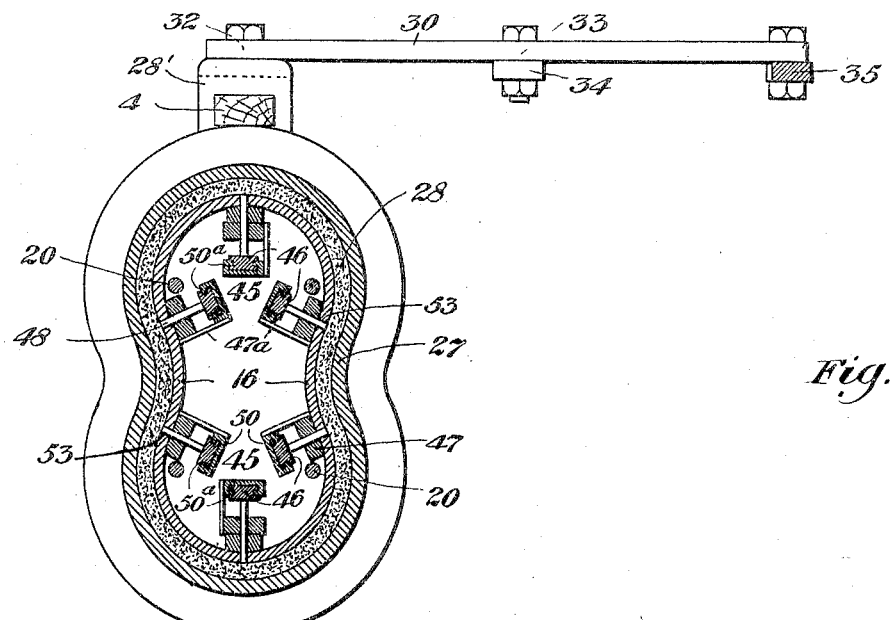
Figure 8:
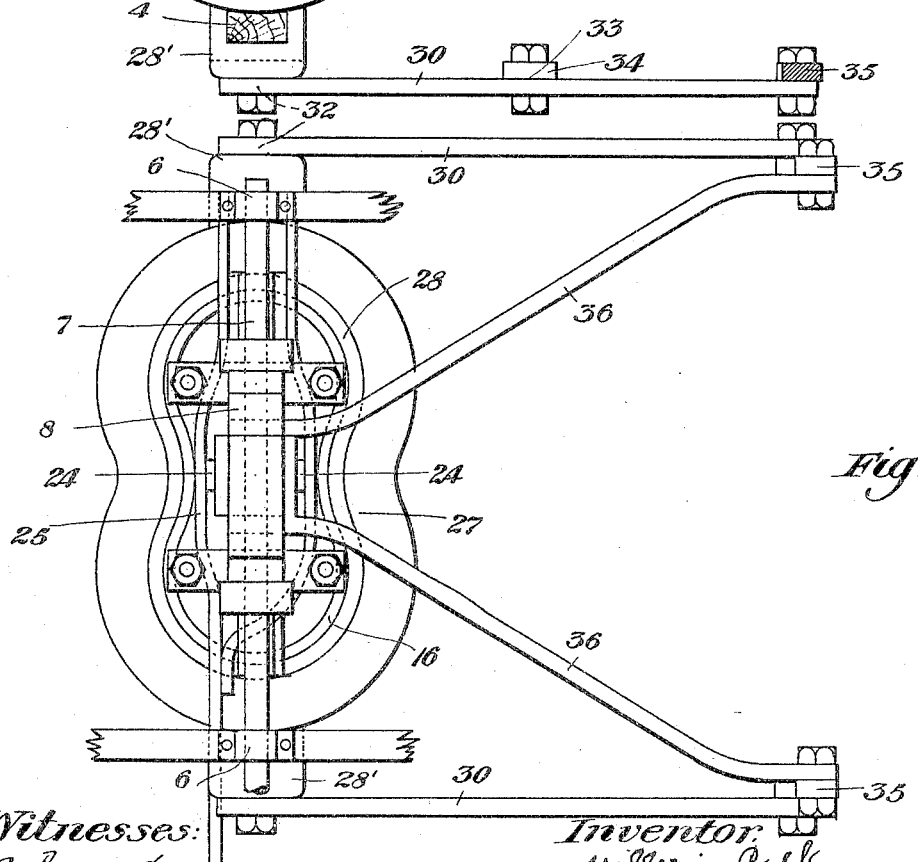

Figure 1 is a vertical elevation of my improved apparatus, showing the parts in position during the molding operation. Fig. 2 is a vertical section taken at right angles to Fig. 1, showing the saggar formed therein. Fig. 3 is a like view showing the plunger and mold withdrawn from each other and the saggar carried by the plunger. Fig. 4 is an enlarged view showing the manner of stripping the saggar from the plunger. Fig. 5 is an enlarged view of one of the devices for puncturing the walls of the saggar. Fig. 6 is a similar view showing the device in the operation of puncturing the walls of the saggar. Fig. 7 is a cross-section taken on the line 7 7, Fig. 3, and Fig. 8 is a plan view of the apparatus.

Like numerals indicate like parts in each figure.

The numeral 2 designates a suitable standard supported upon the base 3. Vertical posts 4 are supported on the base 3, the upper end of said posts having the cross-bars of the frame 5 connected thereto. Bearings 6 in the frame form journals for the shaft 7, said shaft having the double crank 8. At the outer end of the shaft 7 is the gear-wheel 9, with which the pinion 10 meshes, said pinion being mounted on the shaft 11, journaled in the frame. This shaft 11 is provided with the fast and loose pulleys 12 and 13, adapted to be driven by a belt from any suitable source of power.

Connected to the crank 8 is the pitman 14, said pitman being connected to the yoke 15, which is connected to the plunger or inner mold 16. This plunger or inner mold 16 may be of any desired form according to the shape of the saggar or bowl to be formed thereby, and in the present case said plunger is oblong in form with rounded ends, so as to conform to the shape and size of a platter which it is desired to support therein. The plunger or inner mold 16 has the inwardly-projecting bottom flange 17 with a ring portion 18, which forms an offset or recess within which the false bottom 19 of the plunger fits. The bottom 19 has the opening $19^a$, through which the supplemental plunger $19^b$ passes, said plunger moving up and down in the frame $19^c$. A spring $19^e$ bears against the plunger $19^b$ and at its upper end against the frame $19^c$. A set-screw $19^d$ regulates the tension of said spring. The spring acts to force the plunger $19^b$ down through the opening $19^a$ in advance of the bottom 19, and said spring is strong enough to enable said plunger to force its way into the clay in advance of the regular plunger, so as to form a preliminary cavity in the clay and distribute the same to relieve the work of the regular plunger.

Connected to the false bottom 19 are the rods 20, which are connected at their upper ends to the pusher or stripper 21, said stripper having the collar 22, through which the pitman 14 passes. Secured to the lower end of the stripper 21 is the ring 23, which encircles the inner mold or plunger 16. A link 24 is connected to the collar 22 of the stripper 21, the lower end of said link being connected to the lever 25, said lever being pivoted at 26 to one of the posts 4. By raising and lowering the lever 25 the stripper 21 is raised and lowered.

The outer mold 27 conforms in shape to the inner mold 16, a space 28 remaining between the inner walls of the mold 17 and the outer wall of the mold 16, which space forms the mold-cavity for the saggar. The outer mold 27 is provided with the guides 28′, which engage the posts 4 to provide for the vertical movement of the said mold, and levers 30 are connected to said guides, said levers being provided with slots 31 at their inner ends, which engage the pins 32 on the guides 28′ and are fulcrumed at 33 on the support 34. The outer ends of said levers 30 are connected by the rods 35 to the levers 36, connected to the pitman 14. By this construction it is apparent that as said pitman is lowered the outer mold 27 will be lifted to meet the downwardly-moving inner mold, so that the said inner mold enters within the outer mold, all as fully hereinafter set forth.

Mounted upon the standard 2 is the rigid bottom plate 38, which partially supports the saggar, around which plate 38 is the supplemental movable bottom plate 37, adapted to fit snugly within the bottom opening of the outer mold 27. This movable bottom 37 is beveled, so as to fit up against the beveled seat 39 of rigid plate 38. To provide for the lowering of this movable portion 37 of the bottom plate, a lever 40 is provided, said lever being pivoted at 41 and connected at its inner end to links 43, attached to cleats 43′, secured to the movable bottom 37, the lever 40 being forked, as at 42, to pass on each side of standard 2. Upon operating the lever 40 the movable portion 37 of the bottom may be lowered for the purpose fully hereinafter set forth, (to allow air to enter.)

Within the inner mold 16, at proper points therein, are the perforating devices 45, said devices consisting of the two vertical blocks 46 47, the block 46 having the downwardly-inclined pegs 48 secured thereto at suitable intervals, said pegs passing through corresponding openings 49 in the outer block 47. A sliding block 50 fits within guides 50ᵃ in the block 46, and said sliding block is connected to the block 47 by links 47ᵃ, so that by the vertical movement of block 50 the block 46 is moved to and from the block 47. Plates 51 are connected to the sliding blocks 50 of each set of perforating devices, so that by the depression of one of said plates the three perforating devices connected thereto will be operated. Levers 51ᵃ are connected to each of said plates, and by the operation of said levers said plates are lowered to force the block 46 toward the block 47, and consequently force the pins 48 outwardly through openings 53 in the inner mold 16 and perforating the clay or other material forming the walls of the saggar.

In the operation of my improved apparatus the clay or other material from which the saggar or bowl is to be formed is placed upon a bottom plate 38, whereupon power being applied to the machine the pitman 14 descends, carrying with it the plunger or inner mold 16, while at the same time through the connections from said pitman to the outer mold 27 said outer mold is raised, and the inner mold entering within the outer mold the clay is compressed and forced up around in the mold-cavity, so as to form the saggar of the same shape as the outline of the molds. When the saggar has been thus formed, the levers 51ᵃ are operated to depress the plates 51, whereupon the pins 48 perforate the walls of the saggar. The depressing-plates 51 are then elevated and the pins 48 withdrawn. By the next revolution of the shaft 7 the pitman 14 and inner mold 16 are raised, while at the same time the outer mold 27 is lowered, the saggar remaining in contact with the walls of the inner mold. However, before the molds are separated the lever 40 is operated to lower the movable bottom 37 slightly, so as to permit the air to enter the mold-cavity and permit the withdrawal of the molds without injury to the saggar. The saggar, as stated, adheres to the walls of the inner mold, and in order to strip the saggar therefrom the lever 25 is drawn down to the position shown in Fig. 4, whereupon the stripper 21 descends, and the ring 23 bearing upon the upper edge of the saggar strips it from the walls of the inner mold, while at the same time the false bottom 19 descends with said stripper and assists in the stripping of the saggar from the mold. By raising the lever 25 the stripping-frame is elevated and the saggar may be readily removed.

By the above form of apparatus I provide a means for manufacturing saggars with great rapidity and accuracy, there being no skilled labor employed, and the saggars are turned out in greater numbers and at less cost. The machine provides for the puncturing of the walls of the saggar for the reception of the pins for supporting the plates or like articles to be held within the saggar, and the labor of puncturing the walls of the saggar by hand is avoided, while at the same time much greater accuracy in the forming of the apertures is obtained.

What I claim is—

1. In apparatus for forming saggars or like hollow bowls, the combination with a suitable frame, of a shaft journaled therein, a double crank on said shaft, a pitman connected to said crank, an inner mold connected to said pitman, an outer mold, and connections between said outer mold and said pitman whereby said outer mold is moved in an opposite direction to said inner mold.

2. In apparatus for forming saggars or like hollow bowls, the combination with a suitable frame, of an inner reciprocating mold, an outer reciprocating mold, mechanism for bringing said molds into operative position with reference to each other, a movable ring in the bottom of said outer mold forming the outer rim of said bottom, and means for lowering said ring away from the article molded.

3. In apparatus for forming saggars or like hollow bowls, the combination with a suitable frame, of an inner reciprocating mold, an outer reciprocating mold, mechanism for bringing said molds into operative position with reference to each other, a movable portion in the bottom of said outer mold and means for lowering said movable portion.

4. In apparatus for forming saggars or like hollow bowls, the combination with a suitable frame, of an inner reciprocating mold, an outer reciprocating mold, mechanism for bringing said molds into operative position with reference to each other, a movable portion in the bottom of said outer mold, rods projecting down from said movable portion, a ring connecting said rods and a lever connected to said ring for raising and lowering said movable portion.

5. In apparatus for forming saggars or like hollow bowls, the combination with a suitable frame, of an inner reciprocating mold, an outer reciprocating mold, mechanism for bringing said molds into operative position with reference to each other, a stripping-frame, a stripping-ring secured to said frame and encircling said inner mold, and mechanism for raising and lowering said stripper-frame.

6. In apparatus for forming saggars or like hollow bowls, the combination with a suitable frame, of an inner reciprocating mold, an outer reciprocating mold, a rod connected to said inner mold, connections between said rod and suitable reciprocating mechanism, a stripper-frame through which said rod passes, and a stripping-ring on said frame encircling said inner mold, a lever and connections between said lever and said stripping-frame.

7. In apparatus for forming saggars or like hollow bowls, the combination with a suitable frame, of an inner reciprocating mold, an outer mold, a movable bottom on said inner mold and means for raising and lowering said bottom independently of said inner mold.

8. In apparatus for forming saggars or like hollow bowls, the combination with a suitable frame, of an inner reciprocating mold, an outer mold, a vertically-movable frame and a movable bottom on said inner mold connected to said frame.

9. In apparatus for forming saggars or like hollow bowls, the combination with a suitable frame, of an inner reciprocating mold, an outer mold, a vertically-movable stripper-frame, and a movable bottom on said inner mold connected to said stripper-frame.

10. In apparatus for forming saggars or like hollow bowls, the combination with a suitable mold, of a plunger, and an upwardly-yielding supplemental plunger in advance of said first-named plunger.

11. In apparatus for forming saggars or like hollow bowls, the combination with a suitable mold, of a plunger having an opening in the bottom thereof, and an upwardly-yielding supplemental plunger adapted to pass through said opening.

12. In apparatus for forming saggars or like hollow bowls, the combination with a suitable mold, of a plunger having an opening in the bottom thereof, and a spring-actuated upwardly-movable supplemental plunger in advance of said first-named plunger.

13. In apparatus for forming saggars or like hollow bowls, the combination with a suitable mold, of a plunger having an opening therein, an upwardly-movable supplemental plunger adapted to pass through said opening, a frame for said plunger and a spring interposed between said supplemental plunger and said frame.

14. In apparatus for forming saggars or like hollow bowls, the combination with a suitable mold, of a plunger having a movable bottom with an opening formed therein, means for raising and lowering said bottom and a supplemental plunger passing through said opening in said bottom.

15. In apparatus for forming saggars or like hollow bowls, the combination with a suitable mold, of a plunger having a movable bottom with an opening formed therein, means for raising and lowering said bottom, and a yielding supplemental plunger passing through an opening in said bottom.

16. In apparatus for forming saggars or like hollow bowls, the combination of a mold, and mechanism for penetrating from the inside the walls of the saggar formed therein.

17. In apparatus for forming saggars, or like hollow bowls, the combination of a mold, and mechanism for forming inclined pinholes in the walls of the saggar formed therein from the inside.

18. In apparatus for forming saggars or like hollow bowls, the combination of a mold having openings in the wall thereof, a movable frame within said mold, pins on said frame, and means for forcing said pins through said openings to penetrate the saggar.

19. In apparatus for forming saggars or like hollow bowls, the combination of a mold having inclined openings in the wall thereof, a movable frame in said mold, pins on said frame, and means for forcing said pins through said openings to penetrate the saggar.

20. In apparatus for forming saggars or like hollow bowls, the combination of a mold having openings in the wall thereof, pins registering with said openings and means for forcing said pins from the inside through said openings to penetrate the walls of the saggar.

21. In apparatus for forming saggars or like hollow bowls, the combination of a mold having inclined openings in the wall thereof, inclined pins registering with said openings, and means for forcing said pins from the inside through said openings to penetrate the walls of the saggar.

22. In apparatus for forming saggars or like hollow bowls, the combination of a mold having openings in the wall thereof, a block, pins secured in said block, a second block adjacent to said first block having openings through which said pins pass, and means for moving said first block toward said second block.

23. In apparatus for forming saggars or like hollow bowls, the combination of a mold having openings in the walls thereof, a block, pins in said block, a second block adjacent to said first block having openings through which said pins pass, a sliding block on said first block, and connections between said sliding block and said second block.

24. In apparatus for forming saggars or like hollow bowls, the combination of a mold having openings in the walls thereof, a block, pins on said block, a second block adjacent to said first block having openings through which said pins pass, a sliding block on said first block, links connecting said sliding block and said second block.

25. In apparatus for forming saggars or like hollow bowls, the combination of a mold having openings in the walls thereof, a block, pins in said block, a second block adjacent to said first block having openings through which said pins pass, a sliding block on said first block, and connections between said sliding block and said second block, and mechanism for raising and lowering said sliding block.

26. In apparatus for forming saggars or like hollow bowls, the combination of a mold having openings in the walls thereof, a block having guides therein, pins on said block, a second block adjacent to said first block having openings through which said pins pass, a sliding block moving in said guides, and connections between said sliding block and said second block.

27. In apparatus for forming saggars, or like hollow bowls, the combination of a mold having openings in the walls thereof, two or more blocks within said mold, pins on said blocks adapted to enter said openings, connections between said blocks, and a lever adapted to operate said blocks to force said pins through said openings.

In testimony whereof I, the said WILLIAM POLK, have hereunto set my hand.

WILLIAM POLK.

Witnesses:
 A. M. STEEN,
 ROBT. D. TOTTEN.